United States Patent
Byun et al.

(10) Patent No.: US 10,906,499 B2
(45) Date of Patent: Feb. 2, 2021

(54) SIDE IMPACT AIRBAG (71) Applicant: Autoliv Development AB, Vargarda (SE)

(72) Inventors: Jong Ki Byun, Hwaseong-si (KR); Wan Dong Yoo, Hwaseong-si (KR); Tae Ik Gwon, Hwaseong-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 72 days.

(21) Appl. No.: 15/750,692

(22) PCT Filed: May 31, 2016

(86) PCT No.: PCT/KR2016/005766
§ 371 (c)(1),
(2) Date: Feb. 6, 2018

(87) PCT Pub. No.: WO2017/014421
PCT Pub. Date: Jan. 26, 2017

(65) Prior Publication Data
US 2018/0222433 A1    Aug. 9, 2018

(30) Foreign Application Priority Data

Jul. 22, 2015  (KR) .................... 10-2015-0103973

(51) Int. Cl.
*B60R 21/231*    (2011.01)
*B60R 21/207*    (2006.01)
(Continued)

(52) U.S. Cl.
CPC ...... *B60R 21/23138* (2013.01); *B60R 21/207* (2013.01); *B60R 21/235* (2013.01);
(Continued)

(58) Field of Classification Search
CPC ............ B60R 21/23138; B60R 21/207; B60R 21/2338; B60R 2021/23382;
(Continued)

(56) References Cited

U.S. PATENT DOCUMENTS 7,607,682 B2 * 10/2009 Kurimoto ......... B60R 21/23138
280/729
7,793,977 B2 *  9/2010 Sato .................... B60R 21/2338
280/730.2
(Continued)

FOREIGN PATENT DOCUMENTS

JP    2007-223525 A    9/2007
JP    2008-100604 A    5/2008
(Continued)

OTHER PUBLICATIONS

International Search Report for PCT/KR2016/004766, ISA/KR, Daejeon, dated Sep. 13, 2016.
(Continued)

*Primary Examiner* — Paul N Dickson
*Assistant Examiner* — Joselynn Y Sliteris
(74) *Attorney, Agent, or Firm* — Harness, Dickey & Pierce, P.L.C.; Stephen T. Olson (57) ABSTRACT Provided is a side impact airbag which is deployed between two seats in the width direction of a vehicle to thereby prevent passengers seated on the two seats from colliding with each other. The airbag is configured to, when being fully inflated, form recesses on both sides thereof to accommodate the shoulders and arms of the passengers, such that the fully inflated airbag is configured to be maintained in a certain posture by the pressure applied to the shoulders and arms of the passengers accommodated in the recesses.

7 Claims, 5 Drawing Sheets (51) Int. Cl.
*B60R 21/2338* (2011.01)
*B60R 21/235* (2006.01)
*B60R 21/00* (2006.01)

(52) U.S. Cl.
CPC .. *B60R 21/2338* (2013.01); *B60R 2021/0006* (2013.01); *B60R 2021/23146* (2013.01); *B60R 2021/23161* (2013.01); *B60R 2021/23382* (2013.01); *B60R 2021/23576* (2013.01)

(58) Field of Classification Search
CPC ........... B60R 2021/23146; B60R 2021/23161; B60R 2021/0006
See application file for complete search history.

(56) References Cited

U.S. PATENT DOCUMENTS

| | | | |
|---|---|---|---|
| 7,819,419 B2 * | 10/2010 | Hayashi et al. | B60R 21/207 280/729 |
| 7,891,704 B2 * | 2/2011 | Taguchi | B60R 21/23138 280/729 |
| 7,976,058 B2 * | 7/2011 | Suzuki | B60R 21/23138 280/729 |
| 7,997,615 B2 | 8/2011 | Jang | |
| 8,388,019 B2 * | 3/2013 | Wipasuramonton | B60R 21/23138 280/730.2 |
| 8,702,122 B2 | 4/2014 | Tomitaka et al. | |
| 8,783,712 B2 * | 7/2014 | Fukushima | B60R 21/23138 280/730.2 |
| 9,039,037 B2 * | 5/2015 | Fukushima | B60R 21/233 280/730.2 |
| 9,085,280 B2 * | 7/2015 | Katsumata | B60R 21/23138 |
| 9,376,083 B2 * | 6/2016 | Yamanaka et al. | B60R 21/26 |
| 9,452,730 B2 * | 9/2016 | Fujiwara | B60R 21/261 280/730.2 |
| 9,469,268 B2 * | 10/2016 | Sugimoto | B60R 21/23138 |
| 9,505,374 B2 * | 11/2016 | Matsuzaki et al. | B60R 21/207 |
| 9,533,648 B2 * | 1/2017 | Fujiwara | B60R 21/207 |
| 9,669,789 B2 * | 6/2017 | Fujiwara | B60R 21/23138 |
| 9,688,234 B2 * | 6/2017 | Yamanaka et al. | B60R 21/233 |
| 9,873,399 B2 * | 1/2018 | Goto et al. | B60R 21/231 |
| 10,053,044 B2 * | 8/2018 | Masuda et al. | B60R 21/23138 |
| 2009/0302584 A1 * | 12/2009 | Sugimoto | B60R 21/207 280/730.1 |
| 2010/0140909 A1 | 6/2010 | Jang | |
| 2010/0295280 A1 | 11/2010 | Tomitaka et al. | |
| 2017/0158160 A1 * | 6/2017 | Sugimori et al. | B60R 21/207 |
| 2018/0065591 A1 * | 3/2018 | Taguchi et al. | B60R 21/207 |
| 2020/0254961 A1 * | 8/2020 | Gwon | B60R 21/23138 |

FOREIGN PATENT DOCUMENTS

| | | | | |
|---|---|---|---|---|
| JP | 2009-067331 A | | 4/2009 | |
| JP | 2009-154709 A | | 7/2009 | |
| JP | 2010-076642 A | | 4/2010 | |
| WO | WO-2017086707 A1 * | | 5/2017 | ........... B60R 21/231 |

OTHER PUBLICATIONS

Written Opinion of the ISA for PCT/KR2016/004766, ISA/KR, Daejeon, dated Sep. 13, 2016.

* cited by examiner

SIDE IMPACT AIRBAG

CROSS-REFERENCE TO RELATED APPLICATIONS

This application is a 371 U.S. National Stage of International Application No. PCT/KR2016/005766, filed May 31, 2016, which claims the benefit of and priority to Korean Patent Application No. 10-2015-0103973, filed Jul. 22, 2015. The disclosures of the above applications are incorporated herein by reference.

TECHNICAL FIELD

The present invention relates to a side impact airbag that is deployed between two seats in the width direction of a vehicle in the event of a vehicle collision.

BACKGROUND ART

Side impact airbag for protection of passengers during side collision of vehicles are generally known. Side impact airbags include so-called near-side airbags which are deployed by expanding between the passenger and a member comprising the vehicle body, such as a door, and protect a passenger from a member comprising the vehicle body which protrudes inwards from the impact of a side collision, and far-side airbags which restrict movement of the passenger toward the inside of the vehicle due to recoil from the side impact.

In the case of such far side airbags, it is important that the airbag stays in a certain position while inflated. If the inflated airbag is not fixed in a certain position, collision between passengers, especially head to head collisions, occur.

PRIOR ART LITERATURE

Patent Literature

International Publication Number WO2009/035114
Japanese Patent Laid-open Number 2015-110373

DETAILED DESCRIPTION OF THE INVENTION

Technical Problem

The purpose of the present invention is to provide a side impact airbag which is deployed between passengers in the width direction of a vehicle where the position of the inflated airbag is kept constant so as to prevent collision between passengers.

Technical Solution

According to one aspect of the present invention devised to achieve the above-stated purpose, a side impact airbag which is deployed between two seats in the width direction of a vehicle to present collision between two passengers seated on the seats is provided. The airbag is configured to form a recess in the two panels to accommodate the shoulders and arms of the passenger when fully inflated, and the inflated airbag can be maintained at a constant position by pressure from the passengers accommodated in the recesses.

The recesses may be configured to be at an angle toward the front or back of the vehicle to correspond to the inclination of the arms and shoulders of the passengers.

The recesses may be composed of a core line formed by sewing the two panels of the airbag into a predetermined shape.

The seam line may comprise a U-shaped section, and circular sections formed on either end of the U-shaped section.

The recesses may be formed by at least one internal tether connected to the inside of the two panels of the airbag. Both end portions of the internal tether may be placed on the two panels of the airbag at an incline toward the front and bottom of the vehicle and may be connected to the panels through the sewing lines.

Two internal tethers may be coupled with the two panels of the airbag at a certain interval in the upper and lower direction.

The sewing line may be in the shape of a line, arcs facing each other, or a u-shape.

The airbag may be configured to be deployed from a certain structure disposed between a side of at least one of the two seats facing the inside of the vehicle, and the two seats.

Benefits of the Invention

The side impact airbag according to the present invention, having recesses that restrain the shoulders and/or arms of passengers, recess the shoulders and/or arms of passengers during side impact, and is subjected to the load from both passengers from either side of the inflated airbag. Accordingly, due to the interaction between the airbag and passengers, the airbag is firmly supported in a certain position between the passengers, protecting the passengers by preventing collisions therebetween.

BEST MODE(S) FOR CARRYING OUT THE INVENTION

Hereinafter, embodiments of the present invention will be explained in further detail with reference to the attached drawings. It shall be understood that the present invention is not limited by the embodiments disclosed in the following but may be implemented in a variety of forms. The following embodiments are provided simply to complete the disclosure of the present invention, and thereby inform a PHOSITA of the complete scope of the present invention.

In the drawings, the arrow labeled F indicates the front (direction of movement) with respect to the vehicle; the arrow labeled U indicates the upward direction with respect to the vehicle, and; the arrow labeled I indicates the inward direction with respect to the vehicle.

Further, the two passengers are indicated by O1 and O2.

Figure 1:
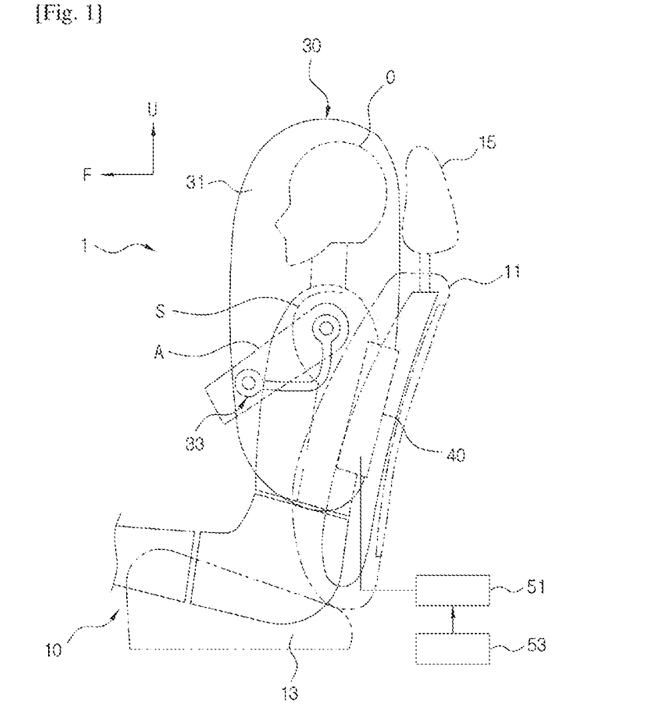
FIG. 1 is a side view illustrating the configuration of the side impact airbag according to the present invention.

FIG. 1 is a side view illustrating the configuration of the side impact airbag according to the present invention.

Referring to FIG. 1, an airbag apparatus (1) is installed on a side of a seat back (11) of a vehicle seat (10) facing the inside of a vehicle.

The seat back (11) of the seat (10) of the vehicle is connected to the rear end portion of a seat cushion (13). A head rest (15) is attached to the top portion of the seat back (11).

The airbag (30) is modularized together with an inflator (40), etc., and is housed in a side portion of the seat back (11) in folded state. The airbag (30) is deployed by inflating using pressure from gas generated by the inflator (40), between two passengers (O1, O2; see FIG. 2) seated in a width direction of the vehicle.

The inflator (40) is electrically connected to a control device (51) mounted on the vehicle. To this control device (51), a side collision sensor (53) that detects side collisions of the vehicle is electrically connected. The control device (51) is configured to trigger the inflator (40) when a side collision of the vehicle is detected based on signals from the side collision sensor (53). In cases where an additional pre-collision sensor that predicts side impacts is electrically connected to the control device (51), the inflator (40) may be configured to be triggered when the control device (51) detects a side collision based on signals from the pre-collision sensor.

The airbag (30) is, for example, formed by two pieces of overlapping nylon-based or polyester-based fabric, whose outer edges are sewed together. The airbag (30) has a shape that is elongated in the upper and lower direction of the vehicle, with a passenger restraint portion (31) that is deployed by inflation. In the passenger restraint portion (31) is formed a recess (33) that accommodates the shoulders (S) and arms (A) of the passengers (O1, O2). The recess (33) is formed to be inclined toward the front and bottom of the vehicle to approximately correspond to the inclination of the shoulders (S) and arms (A) of the passengers (O1, O2).

In one embodiment, the recess (33) may be formed by a seam line (38) having a substantially U-shaped portion (38a) and circular portions (38b) formed on either end of the U-shaped portion (38a). In another embodiment, the recess (33) may be formed by internal tethers connected to either inner side of the airbag (30).

In FIG. 1, an airbag (30) protecting the body and head of a passenger (O) is illustrated. However, the airbag may be configured to have various shapes, for example, to protect only the body of a passenger (O) or be extended downwards to protect the hip-portion of a passenger.

Figure 2:
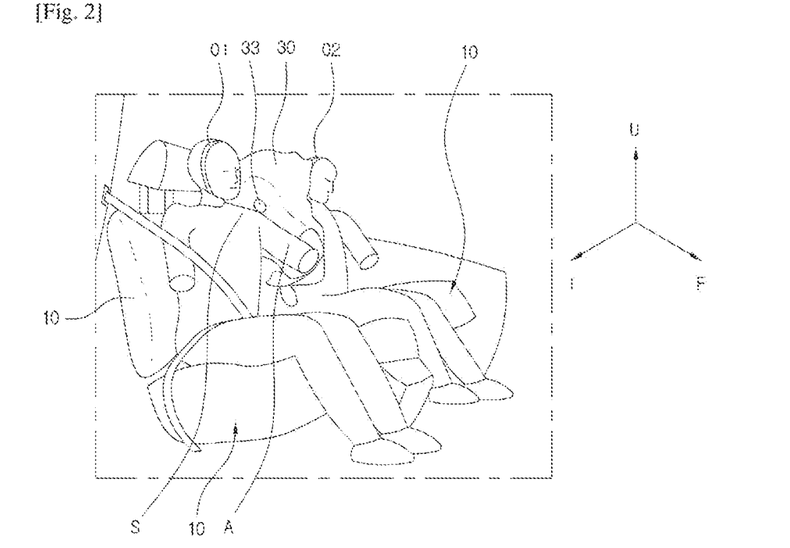
FIG. 2 is a perspective view illustrating the inflated state of the side impact airbag according to the present invention.
Figure 3:
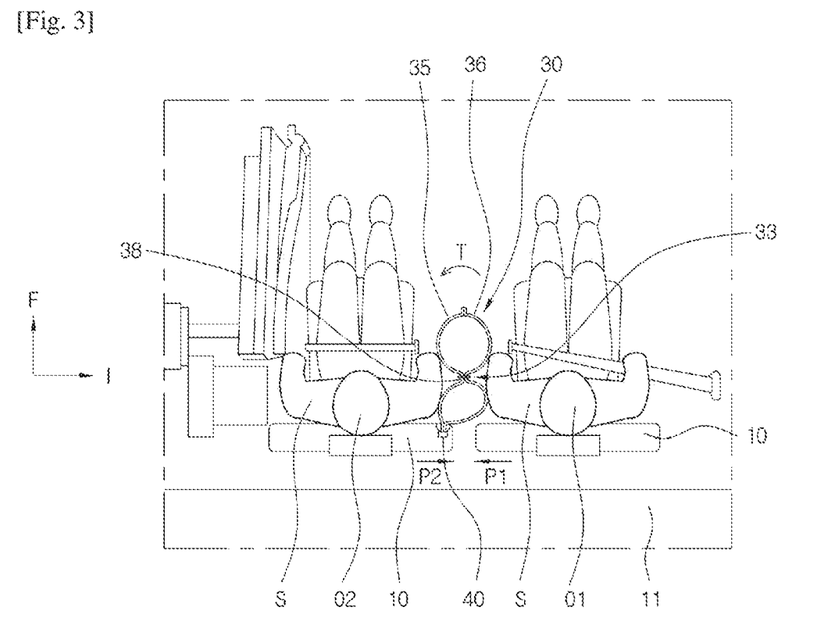
FIG. 3 is a top view illustrating the inflated state of the side impact airbag according to the present invention.

FIG. 2 is a perspective view illustrating the inflated state of the side impact airbag according to the present invention, and FIG. 3 is a top view illustrating the inflated state of the side impact airbag according to the present invention.

Referring to FIG. 2 and FIG. 3, an airbag (30) is deployed between two seats (10) disposed in a width direction of a vehicle. The airbag (30) may be installed on at least one of the two seats (10). In the drawing, it is illustrated that the airbag inflates and is deployed from the inner side of the seat back (13) of the left seat (10) as seen facing the front (F) of the vehicle.

From the inward facing side of the left seat back (11), the airbag (30) inflates and deploys toward the front (F) of the vehicle. That is, the airbag (30) inflates and deploys toward the front (F) of the vehicle from between the two seats (10). On either side (35, 36) of the inflated airbag (30) are recesses (33). The recesses (33) are formed by a seamline (38) that sews together the two sides (35, 36) of the airbag (30).

The recess (33) accommodates the shoulders (S) and/or arms (A) of the two passengers (O) seated on the two seats (10). As a result, the airbag (30) is fixed in a certain position between the passengers (01, 02) by the pressure exerted by the passengers (O1, O2) toward each other, keeping the passengers (O1, O2) from colliding with each other.

For example, in a side collision of a vehicle, when a load (P1) from a passenger (O1) who is moving by inertia toward the center of the vehicle in a width direction is applied to a woven panel (36) of the airbag (30), the airbag (30) tends to rotate about the portion connected to the inflator (40) in the direction of the arrow T.

Here, an opposite force is applied to the woven panel (35) on the other side of the airbag (30) when a load (P2) from the passenger (O2) is seated on the opposite side of the airbag (30). At this time, the shoulder (S) and/or arm (A) of the passenger (O2) is/are restrained by the recess (33) formed on the woven panel (35) on the other side of the airbag (30), more firmly supporting the other side of the airbag (30).

Meanwhile, the shoulder (S) and/or arm (A) of the passenger (O1) is restrained by the recess formed on the woven panel (35) side of the airbag (30). Thereby, the inflated airbag (30) is maintained in a certain position between the two passengers (O1, O2) by the loads (P1, P2) applied by the two passengers (O1, O2).

That is, the present invention prevents collision between the passengers by keeping the airbag (30) in a certain position through interaction of passengers (O1, O2) and an airbag (30) having recesses (33).

Figure 4:
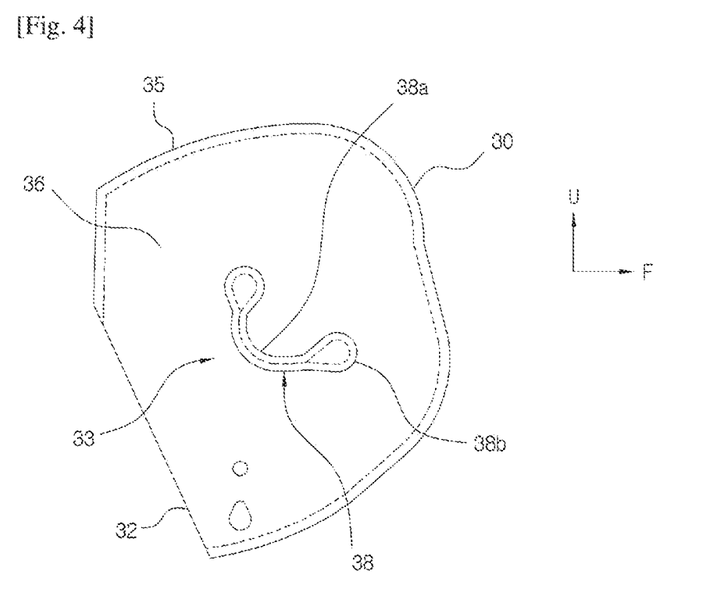
FIG. 4 is a side view of the side impact airbag according to the present invention.

FIG. 4 is a side view of the side impact airbag according to the present invention.

Referring to FIG. 4, the airbag (30) takes on the shape of a pocket by overlapping two sheets of woven panel (35, 36), and sewing together the outer edges of the two overlapped woven panels (35, 36).

The rear portion of the airbag (30) is not sewed but left open. Thereby, a gas injection port (32) which is positioned in a seat back (11) of a seat (10) and connected to an inflator (40, see FIG. 1), through which gas generated by the inflator (40) is supplied.

The two woven panels (35, 36) are overlapped, and substantially central portions of the two woven panels (35, 36) are sewn together to form a core line (38). Through this core line (38), gas is supplied between the two woven panels (35, 36) to inflate the airbag (30), forming a recess (33) in the inflated airbag (30) which accommodates the shoulder (S) and arm (A) of a passenger (O).

The core line comprises a substantially U-shaped portion (38a) and circular portions (38b) formed on either end of the U-shaped portion (38a). The core line (38) consists of two substantially U-shaped closed curves, forming a substantially U-shaped non-inflating area when the airbag is inflated.

The circular portions (38b) prevent the concentration of stresses on either end of the U-shaped portion (38a) when the airbag expands, leading to rupture, and forms a certain concave area which accommodates the shoulder and arm of a passenger (O).

The core line is formed with an inclination toward the front and bottom of the vehicle, to correspond to the arm and shoulder of a passenger (O) seated on the seat.

In another embodiment, the core line may include closed curves of various shapes, such as an ellipse.

Figure 5:
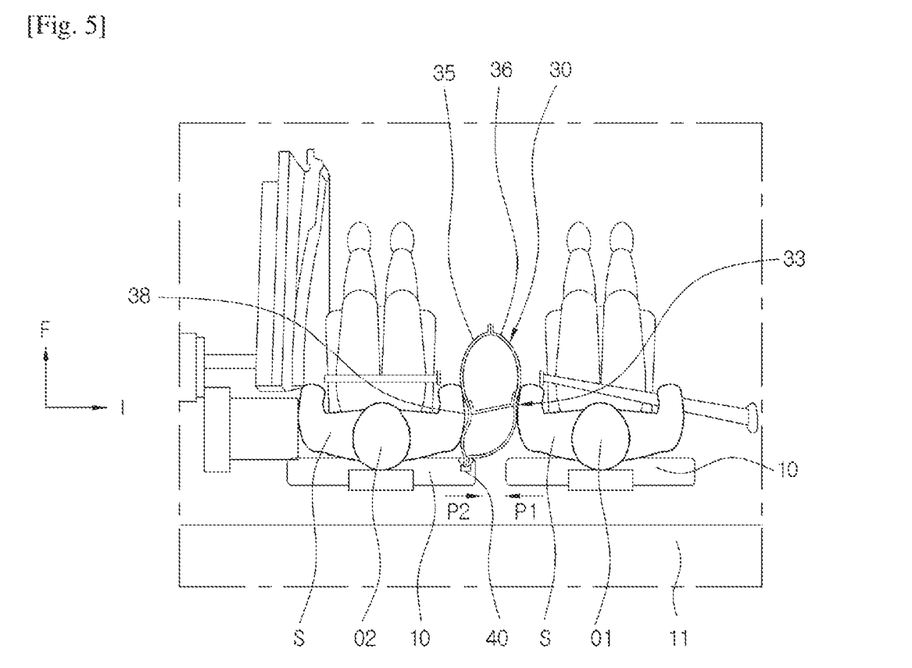
FIG. 5 is a top view illustrating the inflated state of the side impact airbag according to another embodiment of the present invention.
Figure 6:
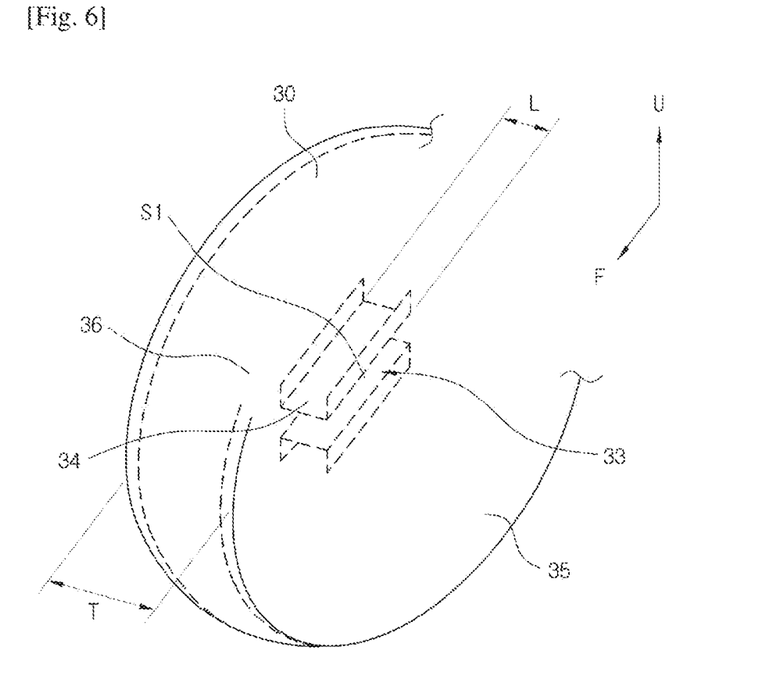
FIG. 6 is a perspective view illustrating the configuration of the inflated side impact airbag according to another embodiment of the present invention.

FIG. 5 is a top view illustrating the inflated state of the side impact airbag according to another embodiment of the present invention, and FIG. 6 is a perspective view illustrating the configuration of the inflated side impact airbag according to another embodiment of the present invention.

The same symbols shall be used for components identical to the configuration explained in the above, and redundant explanations shall be omitted.

Referring to FIGS. 5 and 6, at least one internal tether is connected between the two panels (35, 36) of the airbag (30), forming a recess (33).

By adjusting the length (L) of the internal tethers (34), the degree to which the recess (33) is recessed may be adjusted to adjust the shape of the recess (33).

The length of the internal tethers (34) is less than the thickness (T) of the inflated airbag (30), restraining the two panels (35, 36) of the airbag (30) when the airbag (30) is inflated, forming a recess (33).

Both ends of the internal tethers (34) are disposed on the two panels (35, 36) of the airbag (30) at an incline toward the front (F) and bottom and are joined through a seam line (S1).

The inclination of the seam line (S1) corresponds to the inclination of the shoulder (O) and/or arm of a patient seated on the seat.

A plurality of internal tethers (34) may be installed in the up-down direction at certain intervals. FIG. 6 illustrates two internal tethers (34) installed inside an airbag (30).

The sewing line (S1), as shown in FIG. 6, has a straight shape. Accordingly, the recess (33) may have a substantially straight shape.

Figure 7:
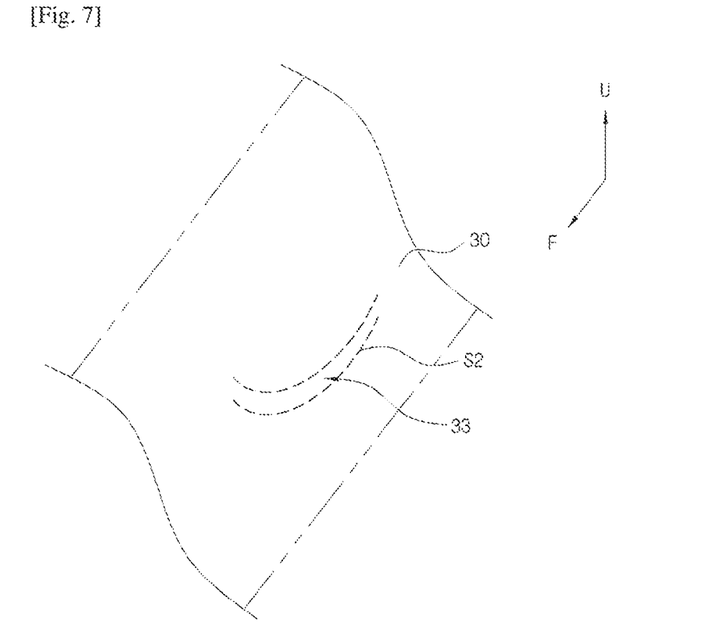
FIG. 7 is a partial side view illustrating a different configuration of the sewing lines in FIG. 6.
Figure 8:
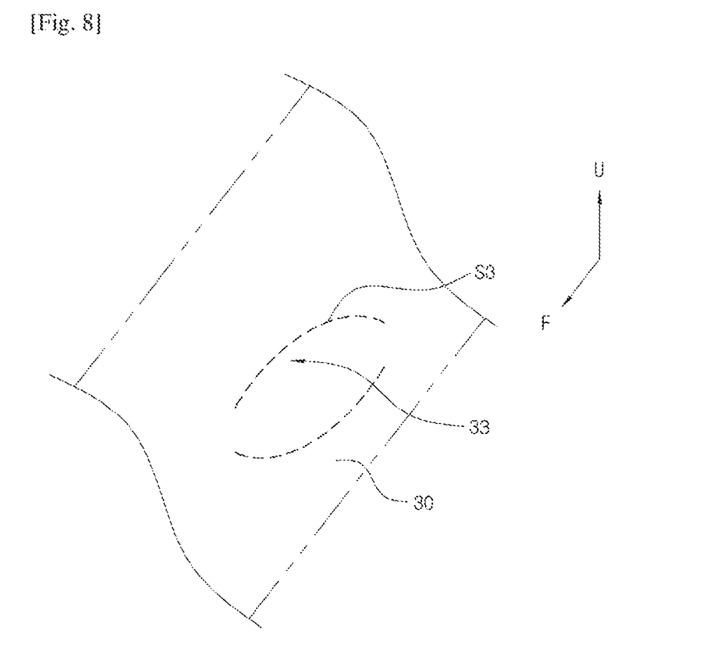
FIG. 8 is a partial side view illustrating yet another configuration of the sewing lines in FIG. 6.

FIG. 7 is a partial side view illustrating a different configuration of the sewing lines in FIG. 6, and FIG. 8 is a partial side view illustrating yet another configuration of the sewing lines in FIG. 6.

Referring to FIG. 7, the sewing line (S2) may have a U-shape. In this case, the recess (33) has a substantially U-shaped shape.

Referring to FIG. 8, the sewing lines (S3) may be in the form of two arcs facing each other. In this case, the recess (33) has a substantially elliptical shape.

In this manner, the sewing line may be formed to have various shapes, forming recesses having various shapes.

Figure 9:
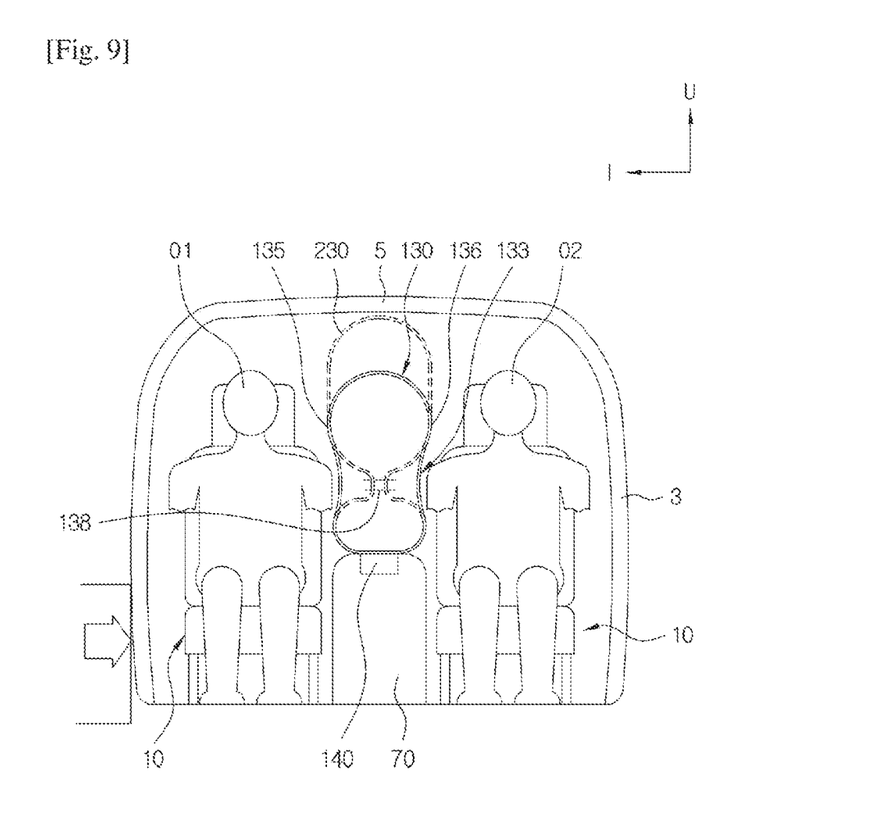
FIG. 9 is a front view of a side impact airbag according another embodiment of the present invention.

FIG. 9 is a front view of a side impact airbag according another embodiment of the present invention.

Referring to FIG. 9, the airbag (130) may be configured to inflate and deploy from a center console (70) interposed between two seats (10).

The airbag (130) is modularized together with an inflator (140), etc., and is contained in a center console (70) between the seat backs (11) in folded state. The airbag (130) inflates and is deployed upward between two passengers (O) seated in a width direction of the vehicle, by pressure from gases generated by the inflator (140).

The central portions of the two woven panels (135, 136) comprising the airbag (130) are sewn together by a core line (138), forming a recess (133). The shoulders (S) and/or arms (A) of the passengers (O) are accommodated by the recess (133), and the airbag (130) is interposed between the two passengers (O1, O2).

Accordingly, the airbag (130) is held in a certain position between the two passengers (O1, O2), preventing collisions between the passengers (O1, O2), especially head to head collisions.

In another embodiment, the recess (133) may be formed using internal tethers.

In another embodiment, the airbag may be configured to inflate and deploy from any vehicle structure between the two seats (10). An airbag (230, dotted lines) may be configured to deploy downward from structures such as the ceiling (5) of the vehicle body (3).

In the following, the operation of the airbag apparatus according to the present invention will be explained.

Referring to FIGS. 1 through 4, when a vehicle collision occurs, a control device (51) detects a side collision based on signals from a side collision sensor (53), causing the control device (51) to trigger the inflator (40). When the inflator (40) discharges gases into the enclosed airbag (30), the airbag (30) inflates and deploys toward the front (F) of the vehicle.

When the airbag (30) expands, a substantially central portion of the airbag (30) is restrained by a core line (38) formed by sewing a substantially central portion of the woven panels (35, 36) on either side of the airbag (30), thus forming a recess (33).

Accordingly, in the event of a side collision of a vehicle, the shoulder (S) and/or arm (A) of a passenger moving toward the inside of the vehicle is/are restrained by a recess (33) on a woven panel (3) of the airbag (30), and the shoulder (S) and/or arm (A) of another passenger (O2) is/are restrained by a recess (33) on another woven panel (35) of the airbag (30). Thereby, with the inflated airbag (30) interposed between the passengers (O1, O2), the passengers (O1, O2) apply pressure on the airbag (30) toward each other.

As a result, the airbag (30) is fixed in a certain position by the pressure applied by the passengers (O1, O2). That is, due to the interaction between the airbag (30) and the passengers (O1, O2), the airbag (30) is supported in a certain position and is able to prevent collision between the two passengers (O1, O2).

In a side collision of a vehicle, a load (P1) from a passenger (O1) who is moving by inertia toward the center of the vehicle in a width direction is applied to a woven panel (36) of the airbag (30). Here, the recess (33) formed on the airbag (30) primarily restrains the shoulder (S) and/or arm (A) of the passenger (O1), preventing movement of the passenger (O1).

Meanwhile, when the load (P1) of the passenger (O1) is applied on the woven panel (36) of the airbag (30) by the passenger (O1), the airbag (30) tends to rotate about the portion connected to the inflator (40) in the direction of the arrow T.

Here, an opposite force is applied to the woven panel (35) on the other side of the airbag (30) when a load (P2) from the passenger (O2) seated on the opposite side of the airbag (30). At this time, the shoulder (S) and/or arm (A) of the passenger (O2) is/are restrained by the recess (33) formed on the woven panel (35) on the other side of the airbag (30), more firmly supporting the other side of the airbag (30). Thereby, the inflated airbag (30) is maintained in a certain position between the two passengers (O1, O2) by the loads (P1, P2) applied by the two passengers (O1, O2).

Thereby, it is possible to prevent collisions between the passengers (O1, O2), especially head to head collisions between the passengers (O1, O2).

The recess (33) may be configured to have a position and angle corresponding to the position of the shoulders (S) and arms (A) of passengers (O1, O2) seated on seats (10) to allow for the shoulders (S) and arms (A) of the passengers (O1, O2) to more easily enter the recess (33), restraining the passengers (O1, O2) even faster.

As described in the above, when the side impact airbag (30) according to the present invention inflates, a recess (33) corresponding to the shoulders (S) and/or arms (A) of the passengers (O1, O2) is formed, causing the shoulders (S) and/or arms (A) of the passengers (O1, O2) to be accommodated in the recess (33) in the event of a side collision, resulting in the airbag (30) being firmly supported between the two passengers (O1, O2) through interaction between the passengers (O1, O1) and the airbag (30). Accordingly, it is possible to prevent collisions, for example head to head collisions, between the two passengers.

The recess (33) may be formed to correspond to the inclination and position of the shoulders (S) and/or arms (A) of passengers (O1, O2) to more easily and firmly restrain the shoulders (S) and/or arms (A) of the passengers (O1, O2) in the event of a side collision.

Whereas, in the embodiments described above, the airbag apparatus (1) is provided on the first seat (driver's seat or passenger seat) of a vehicle, the present invention is not limited thereto. The airbag apparatus (1) according to the present invention may be installed on a second or third seat of a vehicle.

As the operating principle of the airbag apparatus (1) illustrated in FIGS. 5 through 9 is substantially identical to that explained in the above, a detailed explanation shall be omitted.

Whereas the present invention has been described with reference to the attached drawings and preferable embodiments, the present invention is not restricted thereto, but is defined by the claims that follow.

Accordingly, a person having ordinary skill in the art to which the present invention belongs may modify and change the present invention in various ways insofar as they remain within the technical idea of the following claims.

What is claimed is:

1. A side impact airbag for deployment between two seats in a widthwise direction of a vehicle to prevent collision between passengers seated on the two seats, the side impact airbag comprising:
   first and second oppositely facing panels; and
   first and second recesses on the first and second oppositely facing panels, respectively, each of the first and second recesses being continuously shaped and including a first leg extending in a forward direction of the vehicle and a second leg extending in an upward direction of the vehicle, the first and second recesses configured to accommodate shoulders and arms of an adjacent passenger when fully inflated,
   wherein upon full inflation, the side impact airbag is configured to be kept in a certain position by pressure applied by the passengers accommodated in the recesses,
   wherein the first leg of each recess terminates in a first circular portion and the second leg of each recess terminates in a second circular portion,
   wherein the first leg of each recess is spaced from a forward-most portion of the side impact airbag and the second leg of each recess is spaced from an upper-most portion of the side impact airbag,
   wherein the first leg is horizontally oriented and the second leg is vertically oriented such that the second leg is perpendicular to direction of vehicle movement and the first leg is perpendicular to an upward direction of the vehicle upon deployment of the side impact airbag.

2. The side impact airbag according to claim 1, wherein the recesses are formed by a core line formed by sewing together the first and second oppositely facing panels of the airbag in a certain shape.

3. The side impact airbag according to claim 1, wherein each of the first and second recesses is formed by at least one internal tether connected to an inside of the first and second panels of the airbag through sewing lines.

4. The side impact airbag according to claim 3, wherein two internal tethers are connected to the first and second panels of the airbag in an up-down direction at a certain interval.

5. The side impact airbag according to claim 4, wherein each sewing line is in a shape of a line, arcs, facing each other, or a u-shape.

6. The side impact airbag according to claim 1, configured to be deployed from a side of a seat back of at least one of the two seats which faces an inside of the vehicle, or from a certain structure disposed between the two seats.

7. The side impact airbag according to claim 1, wherein the first and second legs are interconnected by an arcuate portion.

* * * * *